US007930967B2

(12) United States Patent
Marquis et al.

(10) Patent No.: US 7,930,967 B2
(45) Date of Patent: Apr. 26, 2011

(54) METHOD FOR ANTIMISSILE PROTECTION OF VEHICLES AND IMPLEMENTING DEVICE

(75) Inventors: Emmanuel Marquis, Bullion (FR); Jean-Paul Pocholle, La Norville (FR)

(73) Assignee: Thales (FR)

( * ) Notice: Subject to any disclaimer, the term of this patent is extended or adjusted under 35 U.S.C. 154(b) by 0 days.

(21) Appl. No.: 11/917,763

(22) PCT Filed: Jun. 7, 2006

(86) PCT No.: PCT/EP2006/062972
§ 371 (c)(1),
(2), (4) Date: Jun. 23, 2008

(87) PCT Pub. No.: WO2006/134050
PCT Pub. Date: Dec. 21, 2006

(65) Prior Publication Data
US 2009/0084252 A1    Apr. 2, 2009

(30) Foreign Application Priority Data
Jun. 17, 2005    (FR) ...................... 05 06178

(51) Int. Cl.
*F41H 11/00*    (2006.01)
(52) U.S. Cl. ............... 89/36.17; 89/36.11; 89/36.12; 89/36.13; 89/36.14; 89/36.15; 89/36.16
(58) Field of Classification Search .................. None
See application file for complete search history.

(56) References Cited

U.S. PATENT DOCUMENTS

| 3,127,608 | A | * | 3/1964 | Eldredge | 342/2 |
| 4,989,006 | A | * | 1/1991 | Roth | 342/1 |
| 5,175,664 | A | * | 12/1992 | Diels et al. | 361/213 |
| 5,355,325 | A | * | 10/1994 | Uhlmann | 342/189 |
| 5,726,855 | A | * | 3/1998 | Mourou et al. | 361/213 |
| 5,814,753 | A | * | 9/1998 | Rieger | 89/1.11 |
| 6,288,974 | B1 | * | 9/2001 | Nelson | 367/135 |
| 6,782,790 | B2 | * | 8/2004 | Barrett | 89/1.11 |
| 6,977,598 | B2 | * | 12/2005 | Longbottom | 340/945 |
| 2004/0118270 | A1 | * | 6/2004 | Barrett | 89/1.11 |
| 2005/0061908 | A1 | * | 3/2005 | Kremeyer | 244/1 N |
| 2007/0040726 | A1 | * | 2/2007 | Kremeyer | 342/52 |
| 2007/0176046 | A1 | * | 8/2007 | Kremeyer | 244/1 N |

FOREIGN PATENT DOCUMENTS

| DE | 102004007405 | 10/2004 |
| EP | 1455199 | 9/2004 |
| WO | WO2005045465 | 3/2005 |

* cited by examiner

*Primary Examiner* — Troy Chambers
*Assistant Examiner* — Samir Abdosh
(74) *Attorney, Agent, or Firm* — Lowe Hauptman Ham & Berner, LLP

(57) ABSTRACT

The present invention relates to a method for antimissile protection of vehicles having a very short response time with practically no false alarms and not requiring the use of means such as decoys or conventional laser jammers, while providing the best possible protection. It is characterized in that at least one curtain of plasma filaments is created between these vehicles and the probable launch point of these missiles, this curtain being intended to blind the target-seeking device of the missiles.

9 Claims, 3 Drawing Sheets

US 7,930,967 B2

METHOD FOR ANTIMISSILE PROTECTION OF VEHICLES AND IMPLEMENTING DEVICE

CROSS-REFERENCE TO RELATED APPLICATIONS

The present Application is based on International Application No. PCT/EP2006/062972 filed on Jun. 7, 2006, which in turn corresponds to French Application No. 05 06178 filed on Jun. 17, 2005, and priority is hereby claimed under 35 USC §119 based on these applications. Each of these applications are hereby incorporated by reference in their entirety into the present application.

FIELD OF THE INVENTION

The present invention relates to a method for antimissile protection of vehicles and a device for using this method.

BACKGROUND OF THE INVENTION

The invention relates to the protection of vehicles such as aircraft (airplanes, helicopters) or ground vehicles (trucks, tanks) from the threat of missiles using infrared, TV or electromagnetic guidance, and more generally, missiles fitted with a target-seeking device, or associated with such a device.

Portable missiles, fired by a single individual, are a significant threat, both from a military point of view and with respect to possible terrorist use. The well-known example of the firing of an IR missile at a jumbo jet during takeoff by a lone activist located in the vicinity of an airport illustrates this type of threat.

In order to combat this type of threat, current solutions are based on the principle of detection of the threat and dealing with it using appropriate countermeasures. The detection is carried out by stationary (ground-based) systems or systems carried on moving vehicles and consists of either radar detection or optical detection. This detection uses tracking methods to trigger such countermeasures as evasive actions, active or passive radar decoys, passive or active infrared decoys and lasers, antimissile weapons, etc.

The current solutions have the following disadvantages. The use of a method of detection then a countermeasure to the threat requires a very short response time compared with the minimum flight time of a missile, since missile flight times are short. This constraint results in a potentially high rate of false alarms. If the system is mounted on an aircraft or a vehicle, the cost and the weight of the system are major factors in the selection of the solution. Moreover, the integration of optronic countermeasure systems into fleets which are already operational can be achieved by the addition of a detachable "pod" which may alter the aerodynamic characteristics of the carrier, which affects the consumption.

The use of decoys, such as infrared jamming canisters, is not possible near civil airports, because of the fire risks inherent in such devices. The use of laser jammers requires a missile/target tracking system ensuring the beam is aimed into the field of view of the missile.

SUMMARY OF THE INVENTION

An aspect of the present invention is a method for antimissile protection of vehicles which has a very short response time with practically no false alarms and not requiring the use of means such as decoys of the type previously mentioned or conventional laser jammers, while providing the best possible protection.

Another aspect of the present invention is also a device for antimissile protection of vehicles which is as simple and light and economical as possible.

In one aspect of the invention, a method for antimissile protection of vehicles includes creating one curtain of plasma filaments between these vehicles and the probable launch point of these missiles, this curtain being intended to blind the target-seeking device of the missiles.

According to one advantageous feature of the invention, the plasma filaments are close together so as to produce an almost continuous ionized layer.

According to another advantageous feature of the invention, the plasma curtain is created by a laser beam sweeping a corresponding portion of space in a plane generally perpendicular to the probable trajectory of missiles on the approach to threatened vehicles.

The antimissile protection device according to the invention is characterized in that it comprises a pulsed laser, a device for controlling the spectral phase of the laser and a spatial sweep device for orienting the laser beam in various directions in space.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other characteristics and advantages of the invention will become apparent with the aid of the description which follows in conjunction with the appended drawings which represent.

DETAILED DESCRIPTION OF THE INVENTION

Figure 1:
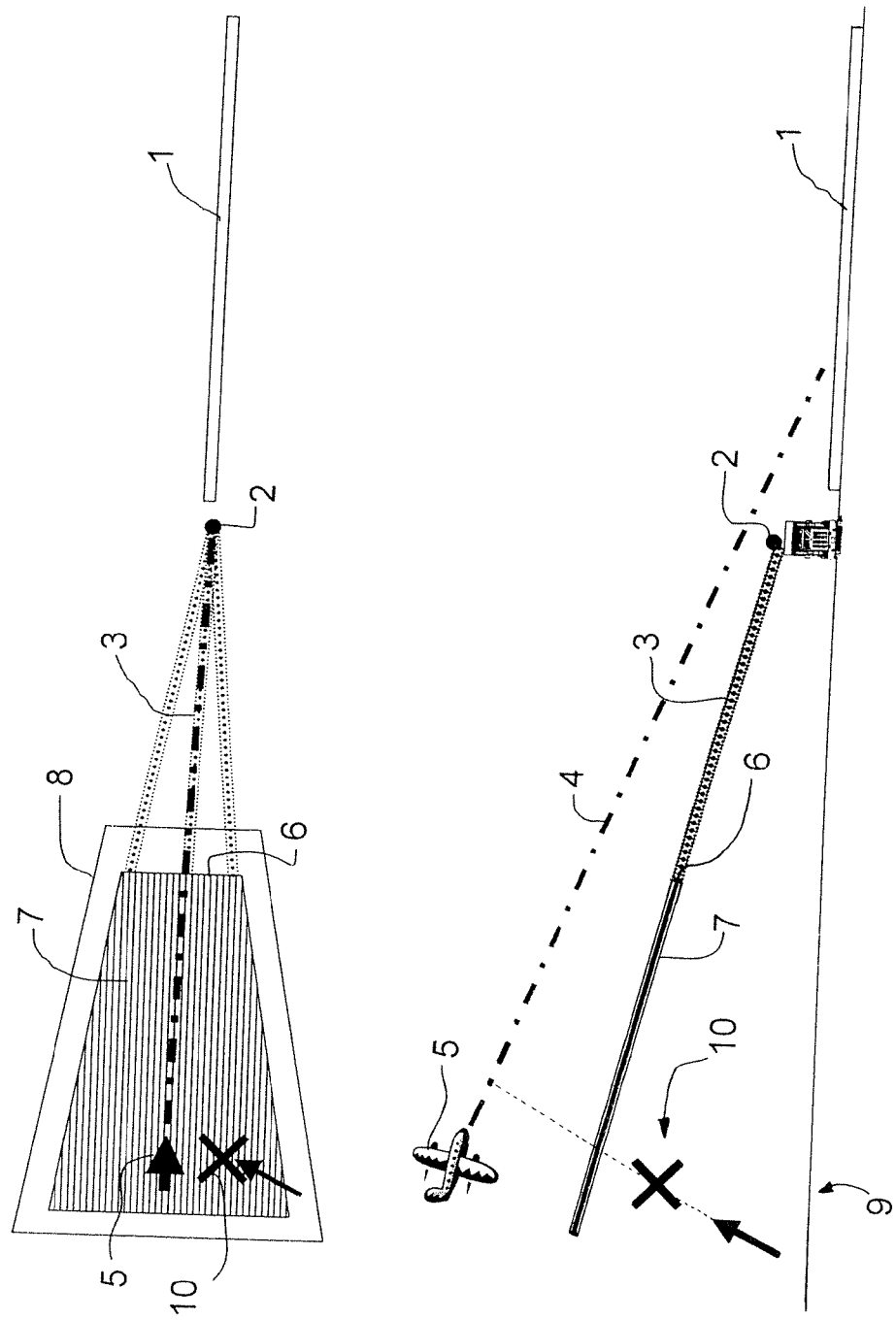
FIG. 1 is a simplified diagram of an example of a device for using the method of the invention for protection of an airport, its upper portion being a top view, and its lower portion a side view.

In brief, the invention includes making a plasma curtain by using a laser placed in a particular area. The purpose of the protective screen formed by this curtain is to prevent the homing devices of missiles from locking on to the target. The invention uses the properties of ultrashort laser pulses (preferably with a duration of less than 10 ps) to create filaments of plasma by ionizing the air. In fact, a laser pulse which spreads through the atmosphere can be focused on a given point in space to create a plasma at this point. Along the extension of this point a filament is then produced in the propagation axis of the beam. This filament spreads over long distances (up to several kilometers) and has emissivity properties like those of a black body brought to high temperature (>1000 K up to 3000° K.). This filament typically has a diameter of a few hundred microns.

The laser used by the invention is a pulsed laser, having a pulse repetition frequency for example between 10 Hz and 10 kHz. The duration of the pulses of this laser is as brief as possible, for example less than 10 ps. In fact, the longer the duration of these pulses, the more energy the laser must supply. This energy is advantageously between 1 mJ and several joules, its value depending in particular on the duration of the pulses and the characteristics of the filaments that need to be produced. The laser wavelength value is not critical. Advantageously, commercially available lasers are used, for example solid-state media of the titanium-sapphire type which have a wide fluorescence spectrum in the vicinity of the 800 nm wavelength, which makes it possible to produce sub-picosecond ("femtosecond") pulses using CPA ("Chirp Pulse Amplifier") technology.

The protective screen is created as follows. The output beam of the pulsed laser is made to sweep in a plane, to create a curtain of filaments that need to be placed between the vehicle to be protected and the homing device or aiming system of a missile. Since the filaments emit in the spectral bands of the sensors with which the homing devices (or target-seeking devices) of missiles are usually provided, a blinding effect and masking of the line of fire occurs. The screen formed by this curtain of filaments can be used either to prevent launches by neutralizing the target acquisition, or to jam the missile in flight by masking the target with an effect similar to that of decoys.

The inventive device, hereinafter simply called a "jammer", essentially comprises the laser such as described above, a device for controlling the spectral phase of this laser and a spatial sweep device for the beam of this laser.

The construction of a laser for creating a filament of ionized air, and the control of the spectral phase of its beam with a view to controlling the length of this filament being already known, will not be described in more detail. A device for controlling the spectral phase of a laser beam is known for example according to the French patent 2 751 095. It will however be noted that since the device for deflection of a laser beam is also already known, the present description relates more particularly to the combination of these various means to produce a screen of filaments and its use for the protection of vehicles.

Schematically illustrated in FIG. 1 is a first embodiment of the invention for the protection of an airport, in which the inventive device is used to create a screen below the planes of descent or ascent of aircraft. The effect of this is to block the line of fire of the homing device of any missile ready to be fired from the side or into the rear section of the aircraft. The device is placed at the end of the runway and aims upward at an angle slightly less than that of the trajectories followed by the aircraft. An azimuthal sweep creates the curtain of filaments. In this FIG. 1, the upper portion is a top view of an example of a configuration of a device of the invention for protecting an airport, while the lower portion of this figure is a side view of this same configuration.

It is assumed, as would usually be the case, that a possible threat of terrorist attack is likely to occur near the takeoff and/or landing runway 1 of an airport, from the ground and generally in an area where the aircraft are at low or very low altitude. To protect these aircraft, there is placed on the axis of the runway 1, along the extension of its end, near this end, a jammer 2 of which the laser beam, when the laser is operating, in the rest position 3 (not sweeping), is directed along the axis of this runway, away from the runway, and of which the angle of elevation is slightly less than the angle of the landing (or takeoff) trajectory 4 of aircraft 5. When the protective device is operating, the laser beam is made to sweep in a plane, generally symmetrically in relation to the rest position 3. The plane in which this sweep takes place is such that its intersection with the ground is perpendicular to the axis of the runway 1. The angle of deflection of the laser beam to provide this sweep depends, in particular, on the distance between the jammer and the edge 6 of the curtain 7 of plasma filaments (edge formed by the points of creation of the filaments) and the lateral extension of the zone 8 where the protection needs to be provided. It will be noted that this protection zone is slightly more extensive longitudinally and laterally than the curtain of filaments because the blinding by a plasma filament of a missile target-seeking device is caused in a space which is wider than the diameter of this filament. The frequency of this sweep depends on the lifetime of the filaments (a few hundred microseconds to a few tens of microseconds, even a few hundred microseconds, depending on the ionization of the medium in which these filaments are created). It is for example a few kHz. Thus, the plasma screen 6 protects the aircraft when they are near the runway 1 (within missile range) against missiles fired from a launch point 9 located near the runway 1, the line of fire coming from this launch point (and passing through a point marked by a cross 10 on the drawing) being able to be directed toward any point in the protected zone 8.

Figure 2:
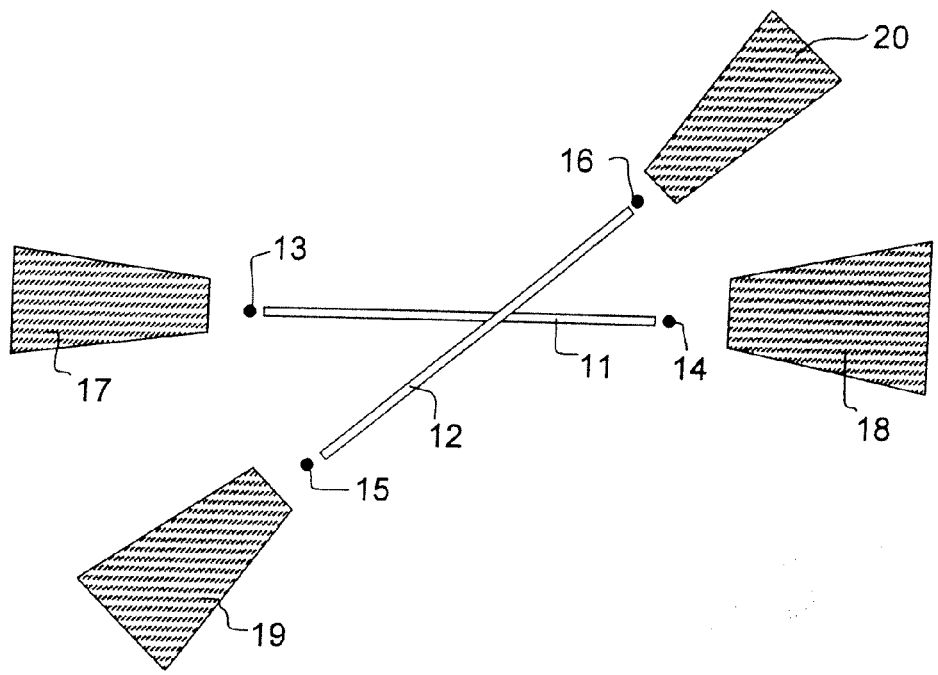
FIG. 2 is a simplified diagram of another example of a device for using the method of the invention for protection of an airport, its upper portion being a top view, and its lower portion a side view.

Of course, to provide better airport protection, it is advantageous to use crisscross multiple jammers placed at the ends of takeoff runways and/or at various distances from these ends. A simplified example of an airport protection is illustrated in FIG. 2. Schematically illustrated in this FIG. 2 are two runways 11, 12 which intersect and which have different orientations. Jammers 13 to 16 are placed near the ends of the runways 11 and 12 respectively, according to an arrangement similar to that of the jammer 2 in FIG. 1. These jammers 13 to 16 create protected zones 17 to 20 respectively, similar to the zone 8 in FIG. 1. In the case of a heliport, the same method is used to protect the low altitude approach or departure corridors of helicopters.

Figure 3:
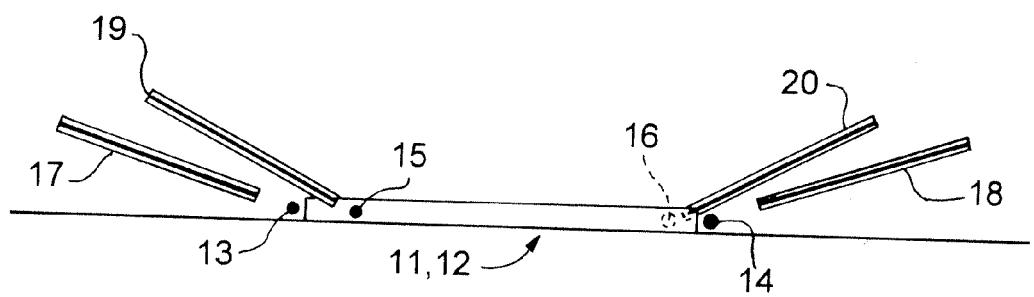
FIG. 3 is a simplified example of a device for using the method of the invention for protection of an airplane in flight.
Figure 3:
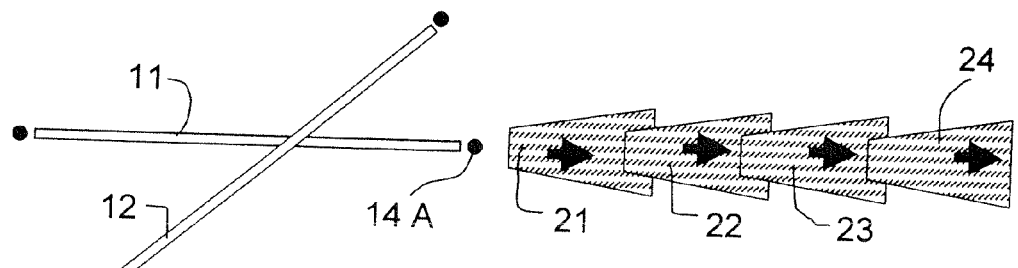

It is also possible to use a method for moving the curtain of filaments which follows the trajectory of the vehicle to be protected. This tracking can be generated at the laser by controlling the focusing distance and/or by controlling the spectral phase of the pulses in order to pre-compensate for the effect of dispersion of the propagation medium, i.e. the atmosphere. Schematically illustrated in FIG. 3 is an example of using such a method at an airport similar to the one in FIG. 2, and comprising the runways 11 and 12. Illustrated is only one mobile protection zone for one jammer 14A (similar to the jammer 14, but able to produce a mobile protection zone). It is clearly understood that all the other jammers 13A, 15A and 16A (similar to the jammers 13, 15 and 16 respectively) can have the same characteristics as the jammer 14A. Illustrated are various successive positions 21 to 24 of the protection zone created by the jammer 14A, the movement of this protection zone being synchronized with the movements of the aircraft to be protected, advantageously so that the aircraft is generally near the center of the protection zone at all times.

Figure 4:
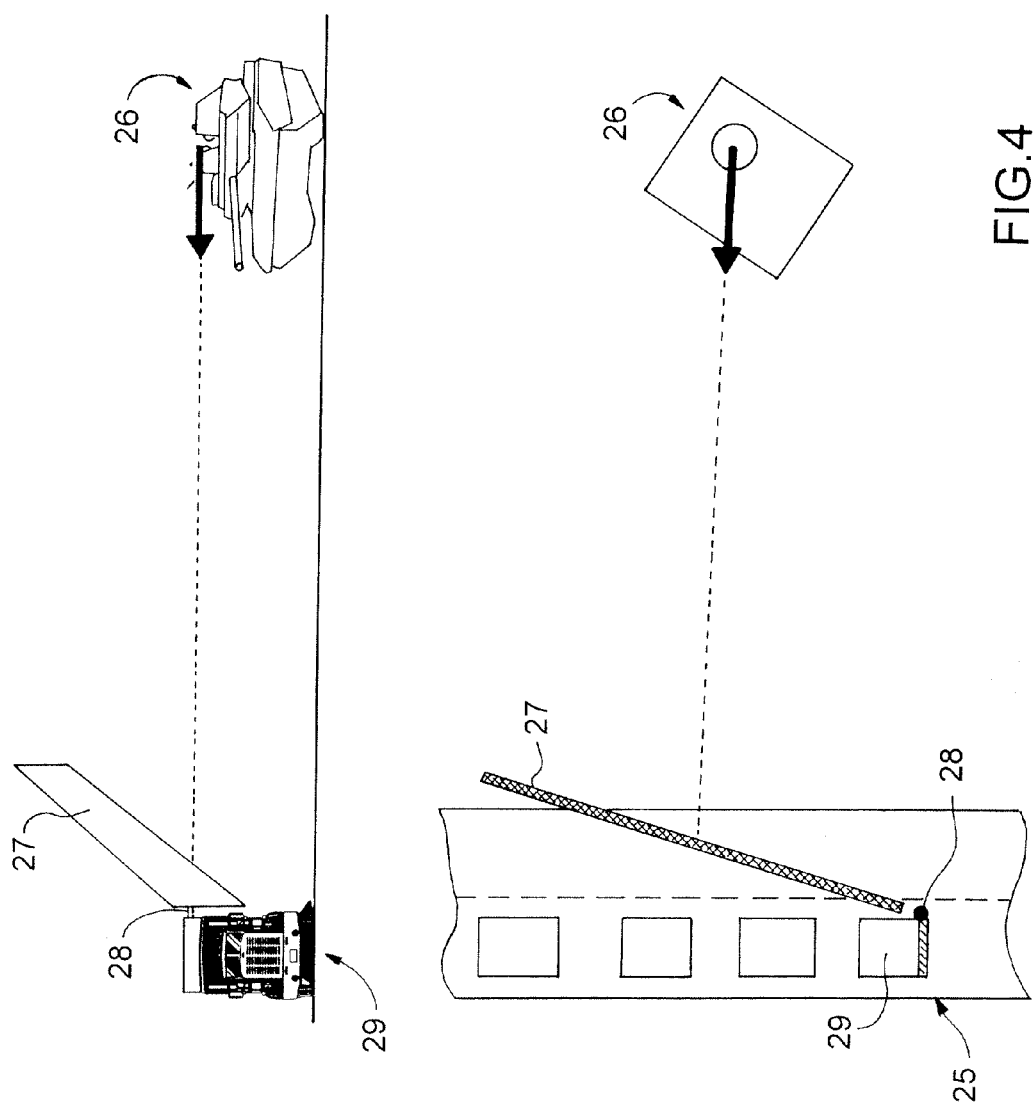
FIG. 4 is a simplified example of a device for using the method of the invention for protection of a ground vehicle, its lower portion being a top view, and its upper portion a front view.

Of course, as illustrated in FIG. 4, the jammer of the invention can be used in the case of the protection of a convoy 25 of moving vehicles on the ground (cargo trucks, for example)

against a ground-ground threat (a tank 26, for example). In that case, the geometry of the plasma curtain 27 generated on board at least one of the vehicles (for example by the jammer 28 placed in the tail vehicle 29) is in the form of a vertical plane placed between the whole of the convoy 25 and the threat 26.

According to another embodiment of the invention, the plasma of the filaments of the curtain of filaments is initiated by using a femtosecond pulsed laser of the type described above, and as soon as the initiation has taken place, instead of maintaining the ionization of these filaments by using the same femtosecond laser, it is maintained by using a power laser of the pulsed type (of a few watts to a few kilowatts, depending on the duration of its pulses), producing relatively long laser pulses (with a duration of several nanoseconds to several microseconds), of which the wavelength is not very critical (it can be located in the infrared, the visible or the ultraviolet).

An advantageous application of the method of the invention consists in generating remotely a virtual object moving in space, this object being either a plasma curtain or a plasma filament. This virtual object can have the dimensions and the form of normal ground or air vehicles, and its movements can, due to its intense brightness, either simulate the trajectory of a vehicle in space, or act as decoys capable of attracting optronic homing sensors. Thus, the protection of real vehicles described above can be replaced or supplemented, by attracting the missiles toward these virtual objects.

The main advantages of the method of the invention and the device for using it are that it does not use a missile detector, and is therefore not limited by a rapid response loop, it helps to mislead optronic homing device missiles and it does not produce any chemical, mechanical or more generally material residues.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method for antimissile protection of vehicles comprising the steps of creating at least one curtain of plasma filaments between the vehicles and a probable launch point of missiles, the curtain being intended to blind a target-seeking device of the missiles, wherein the plasma curtain is created by a laser beam sweeping a corresponding portion of space in a plane generally perpendicular to the probable trajectory of missiles on the approach to threatened vehicles.

2. The method as claimed in claim 1, wherein the plasma curtain is created and maintained by an ultrashort pulse laser of a femtosecond type.

3. The method as claimed in claim 1, wherein the plasma curtain is created by an ultrashort pulse laser of a femtosecond type and, after the initiation of the plasma, it is maintained by using a laser with longer pulses than those having produced the initiation.

4. The method as claimed in claim 1, wherein the laser beam is emitted from a stationary jammer on the ground.

5. The method as claimed in claim 4, wherein the curtain of filaments follows a trajectory of the vehicle to be protected.

6. The method as claimed in claim 4, used for the protection of an airport, wherein the laser beam is emitted from a place located near at least one end of a takeoff or landing runway and wherein the curtain of filaments is created below the planes of descent or takeoff of aircraft.

7. The method as claimed in claim 1, wherein the laser beam is emitted from a jammer mounted on board at least one vehicle to be protected.

8. The method as claimed in claim 7, wherein the vehicle on board which the jammer is mounted is part of a group of vehicles to be protected.

9. The method as claimed in claim 1, used to create virtual objects moving in space.

\* \* \* \* \*